July 16, 1963 C. H. KALTHOFF 3,097,580
SEGMENTED LINEAR GENEVA INDEXING MECHANISM
Filed Dec. 6, 1961 3 Sheets-Sheet 1

INVENTOR.
CLEMENT H. KALTHOFF
BY
ATTORNEY

July 16, 1963 C. H. KALTHOFF 3,097,580
SEGMENTED LINEAR GENEVA INDEXING MECHANISM
Filed Dec. 6, 1961 3 Sheets-Sheet 2

United States Patent Office 3,097,580
Patented July 16, 1963

3,097,580
SEGMENTED LINEAR GENEVA INDEXING
MECHANISM
Clement H. Kalthoff, San Diego, Calif., assignor to General Dynamics Corporation, Rochester, N.Y., a corporation of Delaware
Filed Dec. 6, 1961, Ser. No. 157,346
14 Claims. (Cl. 95—1.7)

This invention relates to indexing mechanisms and, more particularly, to Geneva indexing mechanisms for providing intermittent motion as well as accurate indexing.

Geneva indexing mechanisms are utilized to provide intermittent motion of a plurality of objects which are to be accurately indexed at particular locations during the time that the driven member is at rest.

Since each of the objects is connected to the driven member at different radial positions, the entire assembly moves in unison in accordance with the well known intermittent motion generated in response to the energization of the driving member of the Geneva mechanism. Thus, the driven member and the objects or work pieces carried thereby will move in unison. Thus, the length of time that the work pieces will remain at each work station will have to be long enough to accommodate the longest processing time carried on at any work station in the system. Thus, even though the process carried on at another work station requires less time than the longest processing time, the work piece cannot move on to the next work station upon the completion of the processing since it has to await the completion of the longest process. Such a system, even though highly advantageous because of the accurate indexing of the work pieces at each work station, is not suitable for certain types of operation wherein it is not desirable to have the transferring of work pieces between work stations subject to the completion and transfer of the work piece from the work station having the longest processing time.

It is, therefore, an object of my invention to provide a new and improved Geneva indexing mechanism of the asynchronous type.

It is a further object of my invention to provide independent positive linear indexing and motion control of an object at one or more locations.

It is another object of my invention to provide a Geneva indexing mechanism in which the frames carrying the work pieces contain a segment of the driven member.

It is yet another object of my invention to provide a Geneva indexing mechanism for a multistation system wherein the driven member is segmented to provide a plurality of segmented members for carrying the work pieces with one or more of the stations containing a Geneva driver for indexing the frame and work piece at the particular station.

In accordance with my invention, asynchronous operation plus accurate indexing inherent in a Geneva indexing mechanism is provided by locating Geneva drivers at two or more stations for accurately indexing frames carrying a segment of the driven member of a Geneva mechanism, the movement between stations being automatically provided by a continuously moving transporting means which automatically transports the frame from one station to another upon the ejection of the frame from the previous station. Thus, asynchronous operation is obtained without sacrificing the accurate indexing possible with Geneva indexing mechanisms.

An example of the type system wherein my invention is particularly efficacious is in a xerographic display system wherein the photoconductive member is transported by the frame from a charging station to an exposing station, and thence to a xerographic development station and, finally, to a projection station wherein the developed xerographic image is projected onto a screen. It has been found desirable in such systems to provide for asynchronous operation since it has been found that the exposing operation takes longer than the succeeding development operation. In such systems, it is highly desirable to display the xerographic images as soon as possible after their development in order to display the most recent information as soon as possible after it becomes available. It is, therefore, necessary in such a system to minimize the length of time between the exposure of the xerographic plate and the display of the developed image. Thus, my invention will be described with reference to such a system although it will be recognized that my invention is not limited to usage in such a display system.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawings in which.

Figure 4:
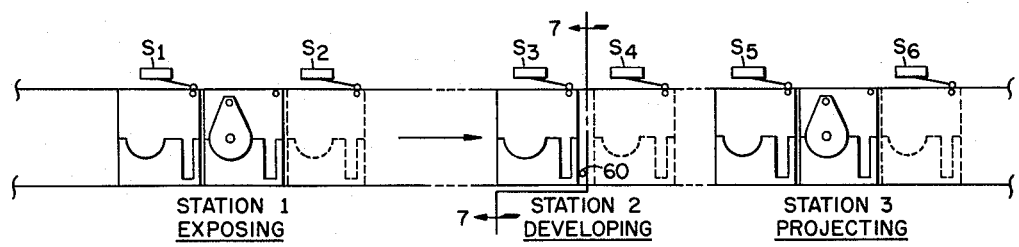
FIG. 4 is a diagrammatic representation of the system of my invention.
Figure 7:
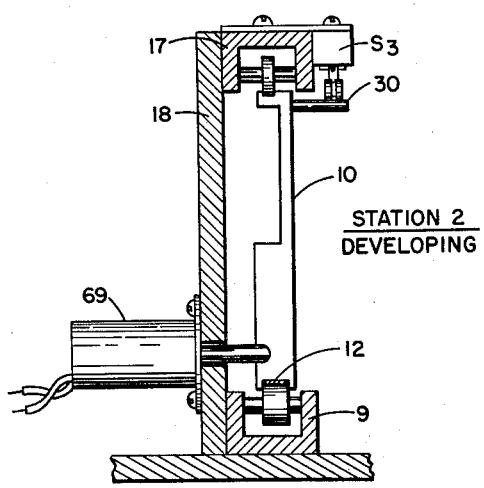
Figure 8:
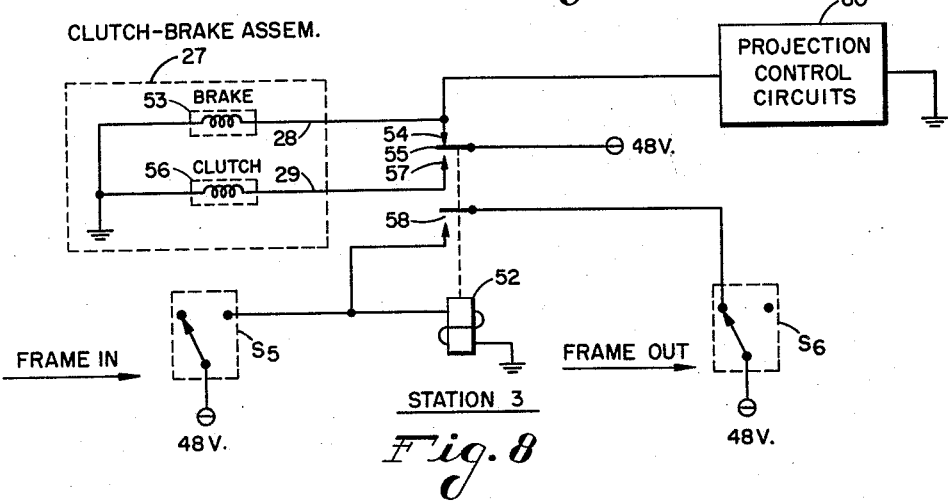

FIG. 7 is a schematic diagram of the control circuitry associated with station 3 of my invention; and FIG. 8 is a sectional view taken along line 8—8 of FIG. 4 to illustrate details of the means for arresting the frame at station 2 in accordance with my invention.

Figure 1:
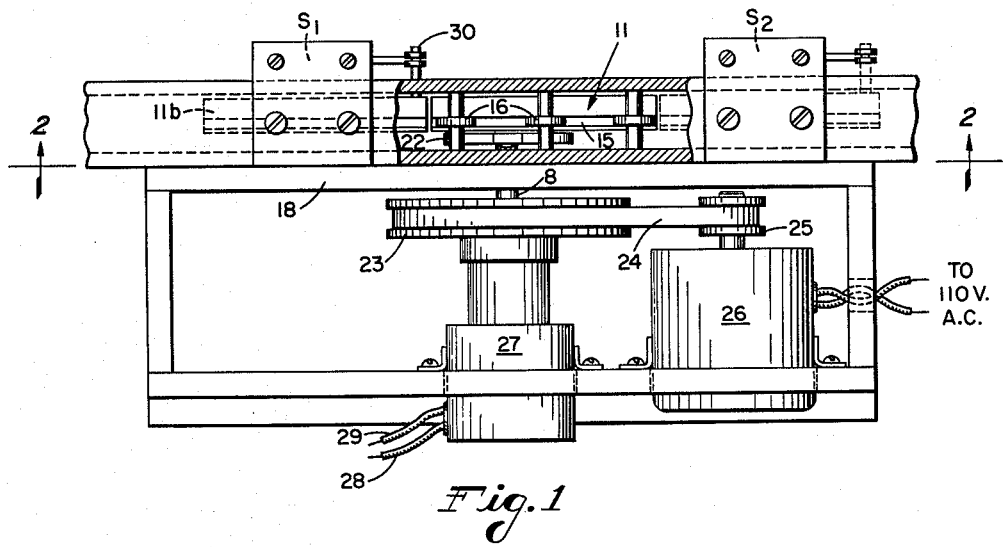
FIGS. 1, 2 and 3 are, respectively, plan, side and sectional views of station 1 of my invention.
Figure 2:
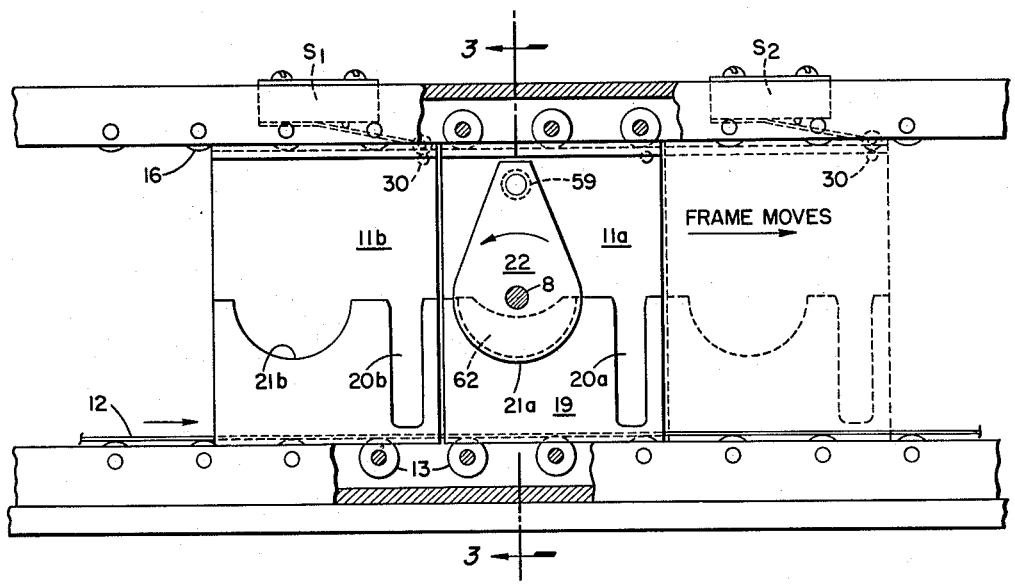
Figure 3:
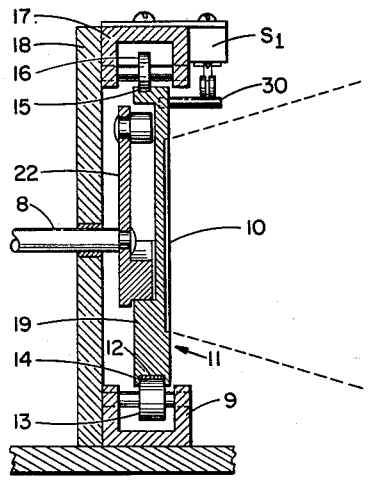

Referring now to FIGS. 1, 2 and 3, which illustrate the details of the exposing station wherein the xerographic member 10 is supported by frame 11 for transportation between the stations of the system by belt 12 which is continuously moving so as to transport frames 11 from one station to the next succeeding station. Belt 12, which is driven by a driving roller and associated drive motor (not shown), is supported by rollers 13 which are journaled in U-shaped bracket 9. The lower edge of frame 11 contains a notch 14, which is coextensive with belt 12 in order to provide lateral support for frame 11 as the frame is transported upon belt 12.

Notch 15 is provided in the upper surface of frame 11 and cooperates with rollers 16 to laterally support the upper edge of frame 11. Rollers 16 are likewise supported in a U-shaped bracket 17 which is supported by plate 18.

Referring more particularly to FIG. 2, the side of frame 11a opposite from the side supporting xerographic plate 10 has a raised portion 19 containing therein a slot 20a and a semicircular cutout portion 21a. Slot 20a and cutout portion 21a comprise a unitary segment of a driven member of a Geneva gear. This segment cooperates with driving member 22, which is supported on shaft 8, which is journaled in plate 18. Pulley 23, which is slidably mounted upon shaft 8, is coupled by belt 24 to drive pulley 25, which is secured to the shaft of motor 26.

Referring to FIG. 1, it can be seen that the motor 26 is directly connected to a source of power so as to be continually operable during the times the system is in use. Consequently, pulley 23 is continually driven by the belt and pulley arrangement and it, in turn, is coupled to shaft 8 through magnetic clutch-brake assembly 27. This assembly is connected to the control circuit, which will be later described with reference to FIG. 5, by conductors 28 and 29.

As will be hereinafter seen, assembly 27 may be selectively controlled to transmit the rotational motion imparted to pulley 23 to shaft 8 to thereby drive driving member 22. Each rotation of driving member 22, assuming a newly arrived frame is present at the input of station 1, will cause the new frame to be indexed in station 1 to the position illustrated in FIG. 2 and will also cause the ejection of the frame presently in the station to the position illustrated by the dotted outline to the right of the station.

When driving member 22 is in the position illustrated in FIG. 2, frame 11a is properly indexed with respect to the optical system (not shown) for exposing xerographic plate 10. The control circuitry associated with station 1 is operated by switches S1 and S2, which are supported from the upper surface of bracket 17 in the positions illustrated. Switch S1 is positioned to be operated by pin 30, which protrudes from the front surface of frame 11, so as to operate switch S1 when a newly arriving frame, i.e., frame 11b, has been transported on belt 12 to a position abutting the trailing edge of frame 11a.

Switch S2, which is positioned beyond the output of station 1, is also supported from the upper surface of bracket 17 in the position illustrated in FIGS. 1 and 2. Switch S2 is also operated by pin 30 of any plate which has been ejected from station 1 upon the operation of driving member 22.

Figure 5:
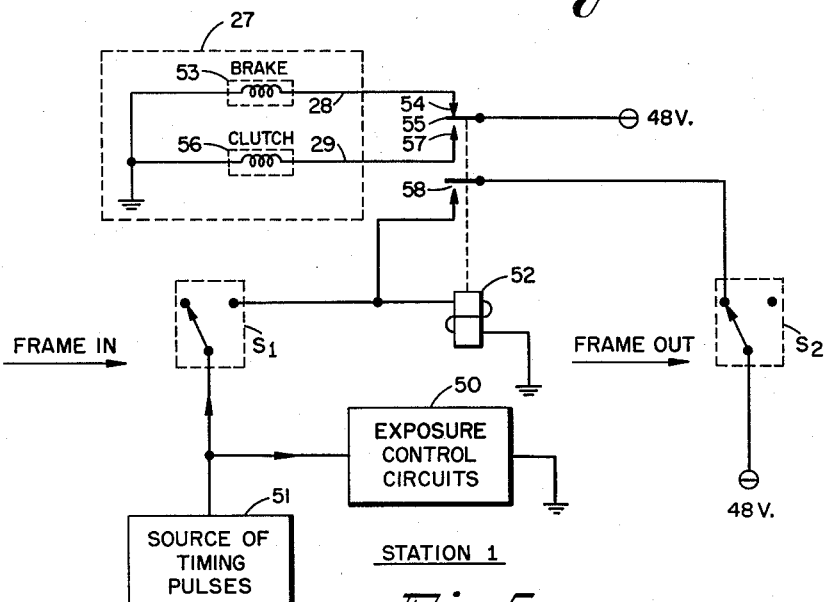
FIG. 5 is a schematic diagram of the control circuitry associated with station 1 of my invention.

Referring now to FIG. 5, which is a schematic diagram of the control circuitry associated with FIG. 1, it may be seen that switch S1 is series connected between Source of Timing Pulses 51 and relay 52. Brake 53 is normally connected to the −48 volt supply via contacts 54 and 55. Upon the operation of relay 52, clutch 56 is energized by the −48 volt source through operated contacts 55 and 57. In addition, a holding circuit for relay 52 is provided by set of contacts 58 which are connected in series with switch S2 between relay 52 and the −48 volt source. Switches S1 and S2 are shown in their non-operated positions. Thus, it may be seen that when a newly arrived frame is present at the input of station 1, switch S1 completes the path between source 51 and relay 52 to thereby energize relay 52 upon the occurrence of the first timing pulse after the operation of the switch.

In the preferred embodiment of my invention, these timing pulses occur every two and a half seconds, the time being selected as being sufficient to properly expose the xerographic plate. However, it will be recognized that it could vary in either direction depending upon the exposure requirements of the xerographic system.

Exposure control circuits 50 which are controlled by the timing pulses issuing from source 51 are thus synchronized with the movement of the frames which carry photoconductive plates 10.

Upon energization of relay 52, brake 53 is de-energized and clutch 56 is energized to thus connect driving member 22 to constantly rotating shaft 8. This causes driving member 22 to start rotating in a counterclockwise direction and when it has rotated approximately 90°, pin 59 is ready to enter slot 20b of the frame standing at the input to the station. As member 22 is driven further, pin 59 carries the frame 11b forward, thus forcing frame 11a forward until frame 11b ends up in the same position as that occupied by frame 11a in FIG. 2. At this point, pin 59 is then just leaving the upper end of slot 20b and crescent-shaped section 62 of driving member 22 comes in contact with cutout segment 21b of frame 11b to thus accurately position this frame with respect to station 1.

Switch S2 provides means for maintaining relay 52 energized after frame 11b start moving forward, thereby causing switch S1 to open its energizing circuits. Switch S2 is located the proper distance from the leading edge of a frame indexed in station 1 such that a frame being ejected will operate switch S2 upon contact with pin 30 at the proper time of the cycle of driving member 22 to cause it to come to rest at, or near, the position illustrated in FIG. 2. However, it will be recognized that the rest position of driving member 22 is not critical in properly controlling the indexing of a frame because of the inherent and well known action of a Geneva indexing mechanism.

The momentary operation of switch S2 de-energizes relay 52, thus de-energizing clutch 56 and operating brake 53 to thereby stop driving member 22. However, the ejected plate will continue to move beyond its position at the point of operating switch S2 due to it being supported by continuously moving belt 12. Belt 12 thus transports the ejected frame to station 2 where it is intercepted by pin 60, which contacts the leading edge of the frame when in the normal position illustrated in FIG. 7. Thus, the frame comes to rest in the position illustrated in FIG. 4. When in this position, switch S3 is in its operated condition due to its contacting pin 30 on the rear of frame 11.

Figure 6:
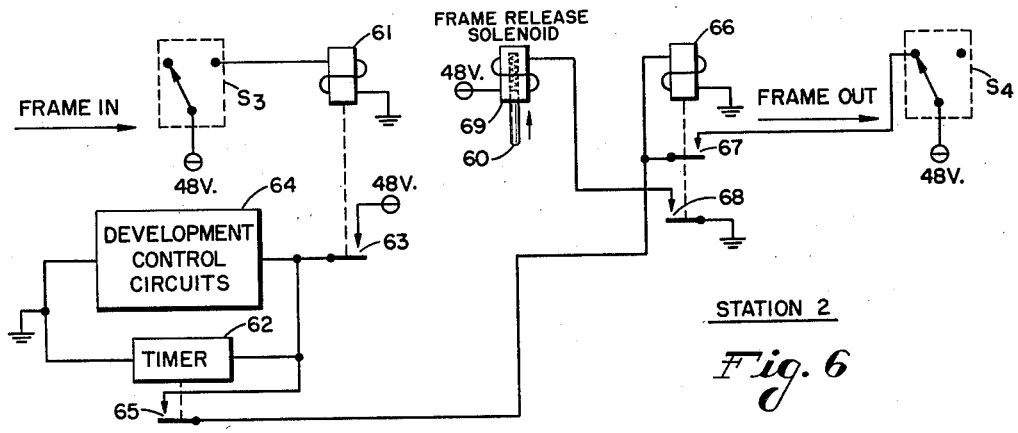
FIG. 6 is a schematic diagram of the control circuitry associated with station 2 of my invention.

Referring now to FIG. 6, which discloses the control circuitry associated with station 2, switch S3 operates relay 61 which energizes timer 62 over operated contacts 63. Contacts 63 also energize Development Control Circuits 64 which institute the process of developing xerographic plate 10. Timer 62 closes contacts 65 upon the completion of a fixed period of time, which time is sufficient for Development Control Circuits 64 to have completely performed the development operation.

Upon the operation of contacts 65, relay 66 is operated and held by contacts 67 and switch S4. The operation of relay 66 also energizes Frame Release Solenoid 69 through contacts 68. Upon energization of Frame Release Solenoid 69, armature 60 is retracted to allow the frame to move toward station 3 upon belt 12.

Upon the release of the frame, switch S3 returns to its normal position, de-energizing relay 61, timer 62 and Development Control Circuits 64. Due to the holding circuit, relay 66 remains energized until pin 30 of the released frame operates switch S4, thereby de-energizing relay 66 and solenoid 69. Thus, armature 60 is returned to its normal position ready to intercept the next frame appearing at station 2.

Thus, when an exposed frame enters station 2, it automatically institutes the development process and simultaneously times this operation so that upon its completion, the timer automatically releases the frame carrying the developed image for transportation to the next station.

Since the construction of station 3 is substantially identical with that of station 1, like parts will bear like reference numerals. In addition, the control circuitry at station 3 is substantially identical with that at station 1 and, consequently, like reference numerals will also apply to like parts of the control circuitry.

Referring now to FIG. 8, station 3 differs from station 1 in that the indexing operation is automatically initiated in response to the arrival of a frame from station 2. Therefore, coincidence with the timing pulse is unnecessary. Consequently, switch S5 is operated when a developed frame appears at the input of station 3, thus initiating the indexing and ejecting operation carried out upon the energization of relay 52. One complete cycle of this operation is terminated by the operation of switch S6 in a manner which will be apparent from the foregoing discussion with respect to FIG. 5. Thus, whenever a newly developed plate is available at the input of station 3, it is automatically indexed into station 3 for projection of the developed image.

Projection Control Circuits 80 provide means for automatically energizing the projector whenever the developed xerographic plate 10 is at rest in station 3.

The xerographic means for exposing, developing and projecting from the photoconductive plate have not been illustrated since they form no part of my invention and are old and well known in the art.

While there has been disclosed what is at present con-

What is claimed is:

1. A segmented Geneva gear system having a plurality of work stations for simultaneously performing a plurality of processes upon a plurality of transportable work pieces which are sequentially presented to the work stations comprising:
   (a) a plurality of transportable work pieces, each of which comprises a unitary segment of a driven member of a Geneva gear,
   (b) a continuously moving work piece transporting means for transporting said work pieces between said work stations,
   (c) first, second and third work stations,
   (d) the first of said work stations having a first predetermined processing time between the initiation of an indexing operation on a new work piece and the later initiation of an ejection operation on said work piece to eject said piece onto said transporting means,
   (e) the second of said work stations having a second predetermined processing time between arrival of a work piece and its later ejection onto said transporting means, said second predetermined processing time being less than said first predetermined processing time,
   (f) said third station comprising means cooperating with said segments of said work pieces for indexing an arriving work piece and ejecting the work piece contained therein in response to the arrival of a work piece from said second station,
   (g) said indexing and ejecting means comprising the driving member of a Geneva gear, and
   (h) means responsive to the arrival of a work piece at said third station for energizing said driving member so as to go through one cycle of operation to thereby index the newly arrived work piece and simultaneously eject the previous work piece.

2. The combination of claim 1 in which said driving member energizing means comprises means operable for sensing the arrival of a work piece at the input of said third station, a source of rotational motion, means operable for coupling said source to said driving member and means operable for operating said coupling means in response to the operation of said sensing means.

3. The combination of claim 2 further comprising means for braking said driving member, said sensing means being momentarily operable as a work piece passes a given position at the input of said third station for momentarily operating said operating means, means for maintaining said operating means in its operated condition until said work piece is indexed to the correct position in said work station at which time said operating means is rendered inoperative, and means for rendering said braking means operative upon said operating means being rendered inoperative.

4. The combination of claim 3 in which said operating means comprises a relay having a set of normally open contacts, said maintaining means comprises a normally closed switch positioned to be operated by the passage of the outgoing work piece past a particular location, a source of potential for maintaining said relay in its operated condition, and means for connecting said contacts in series with said switch means to said source of operating potential, said particular location being selected to render said coupling means inoperative thus disconnecting said source of rotational motion so that said driven member makes one complete revolution in response to the arrival of a work piece.

5. The combination of claim 4 in which each of said work pieces has a switch operating surface, said switch being positioned to be contacted by the operating surface of the work piece being ejected at a time prior to the completion of one complete cycle of said driving member.

6. The combination of claim 5 in which said sensing means comprises a normally open switch positioned to be operated by contacting said switch operating surface of an arriving work piece as it arrives in proximity to the trailing edge of the work piece that is within the station, and means for connecting said normally open switch in series between said source of operating potential and said relay.

7. The combination of claim 1 in which said first work station comprises a source of equally spaced timing pulses, the period of which is equal to said given length of time, and means cooperating with said segments and responsive to the receipt of one of said timing signals when a work piece is at the input of said first work station for indexing said work piece at said input and ejecting the work piece contained therein onto said transporting means.

8. The combination of claim 7 in which said first station indexing and ejecting means comprises the driving member of a Geneva gear, means operable for sensing the presence of a work piece at the input of said first station, a source of rotational motion, means operable for coupling said source to said driving member and means operable for operating said coupling means in response to the receipt of one of said time pulses when said sensing means is in its operable condition.

9. The combination of claim 8 further comprising means for braking said driving member, said sensing means being operable as long as said work piece remains in a particular position at said first station input for operating said operating means, means for maintaining said operating means in its operated condition until said work piece is correctly indexed in said work station at which time said operating means is rendered inoperative and means for rendering said braking means operative upon said operating means being rendered inoperative.

10. The combination of claim 9 in which said operating means comprises a relay having a set of normally open contacts, said maintaining means comprising a normally closed switch positioned to be operated by the passage of the outgoing work piece past a particular location, a source of potential for maintaining said relay in its operated condition and means for connecting said contacts in series with said switch means to said source of potential, said particular location being selected to render said coupling means inoperative thus disconnecting said source of rotational motion so that said driven member makes one complete revolution in response to the receipt of one of said timing signals when a work piece is located at said particular location at the input of said first station.

11. The combination of claim 10 in which said second work station comprises means for interrupting and stopping the movement of a work piece being transported by said transporting means so that it is retained at said second work station, means operable for sensing the presence of a retained work piece in said second station, a timer, means responsive to the operation of said sensing means for energizing said timer while work is being performed on said work piece, said timer being responsive to the passage of an interval of time equal to said second predetermined time for rendering said intercepting means ineffective to thereby release said work piece for movement by said transporting means.

12. The combination of claim 11 further comprising means responsive to said movement of said released work piece beyond said intercepting means for rendering said intercepting means effective for intercepting a later arriving work piece.

13. The combination of claim 12 in which said work pieces comprise a transportable frame and a photoconductive plate mounted on said frame, said first station further comprising means for controlling the exposure of said photoconductive plate under control of timing pulses from said source of timing pulses.

14. The combination of claim 12 in which said work pieces comprise a transportable frame and a photoconductive plate mounted on said frame, said second station further comprising means energizable for controlling the development of said photoconductive plate, and means responsive to the operation of said sensing means for energizing said development controlling means.

References Cited in the file of this patent

UNITED STATES PATENTS

| | | |
|---|---|---|
| 2,620,959 | Merchant | Dec. 9, 1952 |
| 2,789,679 | Taylor et al. | Apr. 23, 1957 |
| 2,856,054 | Fausset | Oct. 14, 1958 |
| 3,028,945 | Marke et al. | Apr. 10, 1962 |

FOREIGN PATENTS

| | | |
|---|---|---|
| 723,534 | Great Britain | Feb. 9, 1955 |